US012466721B2

(12) United States Patent
Porter

(10) Patent No.: US 12,466,721 B2
(45) Date of Patent: *Nov. 11, 2025

(54) SYSTEM FOR DISPENSING LIQUID FROM INVERTED CONTAINER

(71) Applicant: Server Products, Inc., Richfield, WI (US)

(72) Inventor: Thomas Porter, Hartford, WI (US)

(73) Assignee: SERVER PRODUCTS, INC., Richfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,168

(22) Filed: Oct. 31, 2023

(65) Prior Publication Data

US 2024/0059545 A1 Feb. 22, 2024

Related U.S. Application Data

(63) Continuation of application No. 17/889,595, filed on Aug. 17, 2022, now Pat. No. 11,820,642.
(Continued)

(51) Int. Cl.
*B67D 3/00* (2006.01)

(52) U.S. Cl.
CPC ......... *B67D 3/0032* (2013.01); *B67D 3/0061* (2013.01); *B67D 3/0087* (2013.01);
(Continued)

(58) Field of Classification Search
CPC .. B67D 3/0032; B67D 3/0061; B67D 3/0087; B67D 2210/00031; B67D 2210/00047;
(Continued)

(56) References Cited

U.S. PATENT DOCUMENTS 2,786,467 A * 3/1957 Price ..................... A61M 5/162 604/255
4,588,396 A 5/1986 Stroebel et al.
(Continued)

FOREIGN PATENT DOCUMENTS

CN 102838076 A * 12/2012 ........... B67D 3/0025
CN 203359957 U 12/2013
(Continued)

OTHER PUBLICATIONS

International Search Report and Written Opinion for PCT/US2002/040547, mailed Mar. 6, 2023.

*Primary Examiner* — Bob Zadeh
(74) *Attorney, Agent, or Firm* — Quarles & Brady, LLP

(57) ABSTRACT

A liquid dispenser for dispensing a consumable liquid from a container. The dispenser includes a cabinet configured to receive one or more containers in an inverted position such that liquid is induced by gravity to flow out of an open interior of the container though a dispensing opening. A positive pressure valve assembly is mounted to the dispensing opening of the container prior to insertion of the container into the cabinet. The valve assembly includes a cap connected to the dispensing opening and a discharge tube extending from the cap. A flow restrictor of the valve assembly is positioned to selectively open and close the discharge tube to control the flow of liquid from the container. A one-way valve is positioned between the open interior of the container and a supply of air. The one-way valve allows air flow into the container as the fluid is discharged to maintain a positive pressure within the container.

24 Claims, 10 Drawing Sheets

Related U.S. Application Data

(60) Provisional application No. 63/233,944, filed on Aug. 17, 2021.

(52) U.S. Cl.
CPC .............. *B67D 2210/00031* (2013.01); *B67D 2210/00047* (2013.01)

(58) Field of Classification Search
CPC .......... B67D 3/0025; B67D 3/02; B67D 3/04; B67D 3/041
See application file for complete search history.

(56) References Cited

U.S. PATENT DOCUMENTS

| | | | | |
|---|---|---|---|---|
| 4,715,516 | A | 12/1987 | Salvail | |
| 4,722,463 | A | 2/1988 | Anderson | |
| 5,791,517 | A * | 8/1998 | Avital | B67D 3/043 222/481.5 |
| 5,810,204 | A | 9/1998 | Devlin et al. | |
| 5,848,736 | A * | 12/1998 | Boumann | B67D 3/0032 222/481.5 |
| 6,378,742 | B1 | 4/2002 | Rohr et al. | |
| 6,442,960 | B1 | 9/2002 | Fournier et al. | |
| 7,021,206 | B2 | 4/2006 | Eckenhausen et al. | |
| 7,188,751 | B2 | 3/2007 | Van Der Klaauw et al. | |
| 7,472,807 | B1 | 1/2009 | Black | |
| 7,810,679 | B2 * | 10/2010 | Wauters | B67D 1/0462 222/401 |
| 10,046,961 | B2 | 8/2018 | Miner | |
| 10,362,896 | B2 | 7/2019 | Apone et al. | |
| 10,507,441 | B2 * | 12/2019 | O'Brien | G05D 11/132 |
| 11,820,642 | B2 * | 11/2023 | Porter | B67D 3/0087 |
| 2002/0070234 | A1 | 6/2002 | Sunnarborg | |
| 2003/0164337 | A1 * | 9/2003 | Maas | C02F 1/74 210/138 |
| 2005/0109800 | A1 * | 5/2005 | Cote | B67D 3/046 222/481.5 |
| 2012/0267396 | A1 | 10/2012 | Quinlan et al. | |
| 2015/0129611 | A1 | 5/2015 | Vulpitta et al. | |
| 2016/0297665 | A1 * | 10/2016 | Petermann | B67D 1/1422 |
| 2020/0062575 | A1 | 2/2020 | Sullivan | |

FOREIGN PATENT DOCUMENTS

| | | | | |
|---|---|---|---|---|
| DE | 20007148 | U1 * | 7/2000 | B67D 3/0003 |
| FR | 3041614 | A1 * | 3/2017 | |
| GB | 2186265 | B | 11/1989 | |
| WO | 2006043247 | A1 | 4/2006 | |
| WO | WO-2017155374 | A2 * | 9/2017 | B67D 1/0462 |
| WO | 2024020335 | A2 | 1/2024 | |

* cited by examiner

SYSTEM FOR DISPENSING LIQUID FROM INVERTED CONTAINER

CROSS REFERENCE TO RELATED APPLICATION

The present application is a continuation application of U.S. application Ser. No. 17/889,595, filed Aug. 17 2022, which application is based on and claims priority to U.S. Provisional Patent Application Ser. No. 63/233,944, filed Aug. 17, 2021 the contents of which are incorporated by reference in their entireties.

BACKGROUND

The present disclosure generally relates to a system and method for controlling the flow of a liquid from a liquid container. More specifically, the present disclosure relates to a system and method that allows the original liquid container to be inverted such that the stored liquid flows from the original container due to gravity and the flow of liquid is controlled.

Presently, many restaurants or other food or beverage preparation and serving locations serve liquid beverages, such as orange juice, milk, non-dairy milk, tea or other juices etc. that are shipped and stored at the restaurant in a storage container, such as a one gallon jug. When the liquid is going to be dispensed to a customer, a staff member at the facility needs to retrieve the storage container from a refrigerator and pour the liquid into either another beverage or into a cup or mug for consumption by the customer. These steps require the staff member to retrieve and lift the storage container each time the liquid is required. Each time the liquid is added to the food item or dispensed for consumption, the staff member must either measure the amount added or simply estimate the amount of liquid that is added to the food item. Such process introduces variability into the creation of the food item, especially across different locations of a large chain store.

In some restaurants, a liquid cooler is placed on a counter and up to eight gallons of a consumable fluid, such as milk, juice, tea, alternative dairy milk, etc. are poured from their own storage containers into a large holding tank for dispensing from the liquid cooler. Such a cooler requires the staff member to pour the liquid from the individual one or two gallon container or jug into the holding tank. At regular intervals, the holding tank must be emptied and cleaned, which increases down time and take up staff time.

Therefore, the inventors have recognized a need to accurately dispense a desired volume of one or more liquids, such as milk, non-dairy milk, tea, juice, etc. directly from the original storage container while reducing the amount of physical effort and time required of the worker. Once the storage container has been emptied, the storage container can be thrown away and a new, full storage container used.

SUMMARY

The present disclosure relates to a system for regulating and controlling the dispensing of a consumable liquid, such as but not limited to milk, juice, tea, non-dairy milk, from an original storage container using gravity. The system allows the liquid to remain in its own storage container and to be dispensed directly from the storage container without having to be transferred to a dispensing container or vessel. The system of the present disclosure is able to control the portion volume dispensed to more accurately control the creation of a food item.

A liquid dispenser of the present disclosure is provided to dispense liquid from a container that includes a main body sized to receive and retain the liquid. The container includes a dispensing opening that provides a point of exit for the liquid from the container. The liquid dispenser includes a cabinet that is sized to receive one or more containers in an inverted position such that the liquid flows out of the dispensing opening of the container under the influence of gravity. In one contemplated embodiment, the interior of the cabinet can be climate controlled to either cool or heat the liquid when the liquid is in the container and the container is in the cabinet.

A positive pressure valve assembly is designed to be used with the container to control the flow of liquid from the container when the container is inverted in the cabinet. The entire positive pressure valve assembly is designed to be installed on the dispensing opening of the container before the container is inverted and positioned within the cabinet. In this manner, the container and positive pressure valve assembly can be combined before the combination is inverted and then inserted into the cabinet for dispensing.

The positive pressure valve assembly includes an engagement collar that is sized to be securely attached to the dispensing opening of the container. In one contemplated embodiment, internal threads on the engagement collar receive and retain a mating set of external threads on the dispensing opening of the container. It is contemplated that the dispensing opening could be formed as part of a spout or neck that is part of the container, although other configurations for the container can be used with the positive pressure valve assembly of the present disclosure.

The positive pressure valve assembly further includes a dispensing tube that extends from the engagement collar and includes an internal liquid passageway that ends at a fluid outlet. In one contemplated embodiment, the dispensing tube may be formed from a flexible material that can be collapsed to prevent the passage of liquid out of the dispensing tube.

A flow restrictor of the positive pressure valve assembly is positioned to selectively open and close the dispensing tube to control the flow of liquid out of the dispensing tube. In one contemplated embodiment, the flow restrictor can be moved to a first position to collapse the dispensing tube to prevent flow of the liquid. The flow restrictor can be biased into the first position such that fluid is prevented from leaving the container until the flow restrictor is moved against the bias force. The flow restrictor can be moved away from the dispensing tube to allow for the flow of liquid. In one contemplated embodiment, the flow restrictor is biased into a position to close the dispensing tube under the influence of a bias member, such as a bias spring. The flow restrictor is moved against the bias force to open the dispensing tube.

In one contemplated embodiment, the positive pressure valve assembly includes a one-way valve that is positioned in the engagement collar. The one-way valve assembly is configured to allow air to flow into an open interior of the main body of the container as liquid is dispensed to maintain a positive pressure within the open interior. The positive pressure in the container allows for the free flow of liquid from the container due to the influence of gravity on the supply of liquid in the inverter container. The one-way valve is in communication with an air supply member that has an air flow passageway that includes an air inlet and an air outlet. The air outlet communicates with the one-way valve such that an air flow at a positive pressure at the air outlet opens the one-way valve to allow air to flow into the container. In one contemplated embodiment, the air flow is provided at a positive air pressure.

The liquid dispenser can include an air producer that creates the positive pressure air flow that is received at the air inlet of the air supply member. The positive pressure air flow will over come the pressure created by the liquid in the container and open the one-way valve to allow air to enter into the container. A controller of the liquid dispenser is configured to activate the air producer and control the movement of the flow restrictor to control the discharge of liquid from the dispensing tube. In one contemplated embodiment, the air supply device and the flow restrictor movement are coordinated by the controller during dispensing of the liquid to maintain the positive pressure in the container as the liquid is dispensed.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
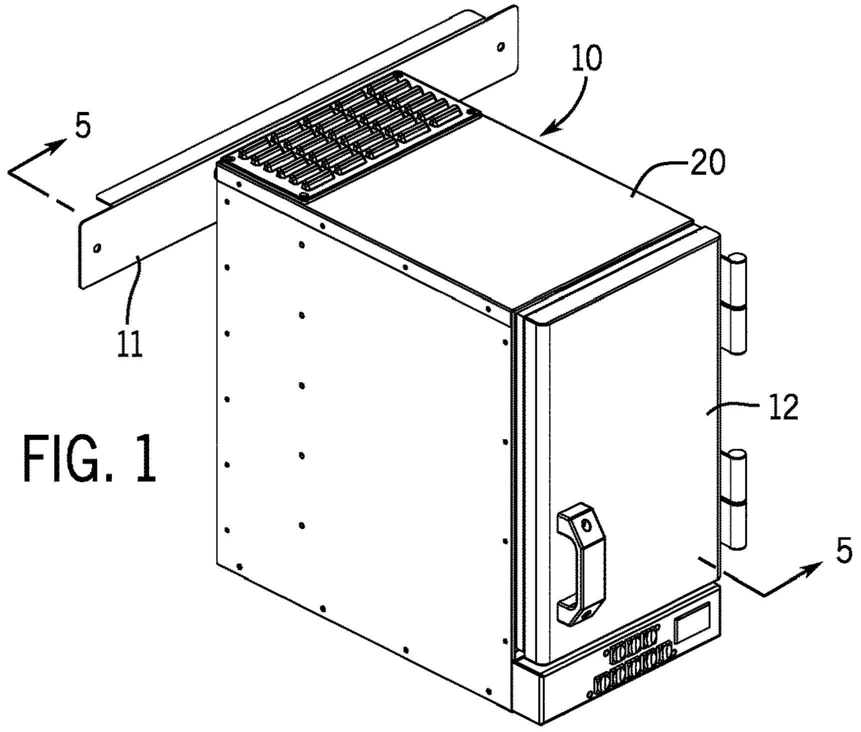
FIG. 1 is a front perspective view of a liquid dispenser of the present disclosure.
Figure 2:
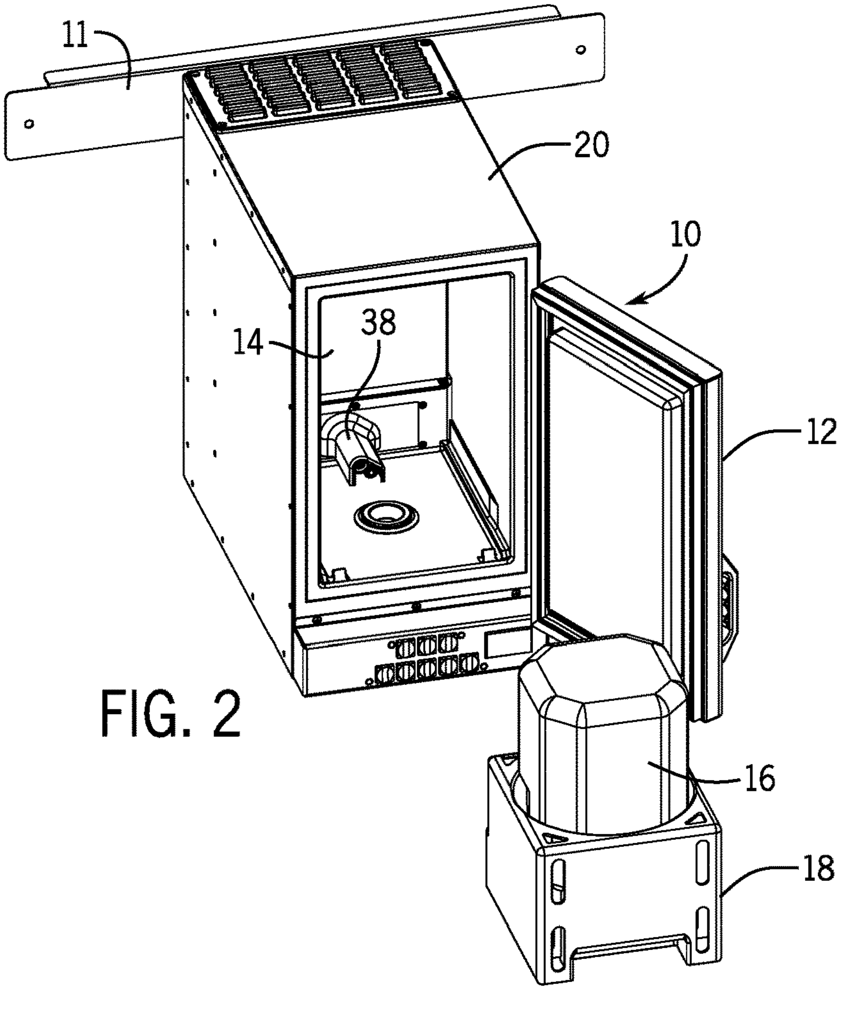
FIG. 2 is a front perspective view of the liquid dispenser with a front cabinet door open and a container and support removed from the open interior.

FIGS. 1 and 2 illustrate a liquid dispenser 10 constructed in accordance with the present disclosure. In the embodiment illustrated, the liquid dispenser 10 is designed to be supported by a mounting bracket 11 above a counter of a restaurant or other location where food or beverages can be ordered and/or prepared and is connected to a source of electricity. However, other ways to support the liquid dispenser 10 are contemplated, such as support on a horizontal surface, such as a counter. The liquid dispenser 10 of the present disclosure is designed to refrigerate and dispense a consumable liquid, such as but not limited to milk, non-dairy milk, tea, flavored water or some type of juice. The liquid dispenser could be used with consumable liquids that either need refrigeration or can be stored and dispensed at ambient temperatures.

The liquid dispenser 10 of the embodiment illustrated includes a compressor to drive the refrigeration of the liquid. In a contemplated, alternate embodiment, the liquid dispenser 10 could eliminate the cooling components and would operate to dispense liquid at ambient temperature or could be insulated to maintain the liquid at a cooled temperature. Such embodiment would eliminate the need to connect the liquid dispenser 10 to a source of electricity. The liquid dispenser 10 includes an access door 12 that can be opened to provide access to an open interior 14 of the dispenser 10.

In the embodiment shown in FIG. 1, the open interior 14 is sized to receive a container 16 for the liquid being dispensed. In the case of milk, each of the containers 16 is a one gallon milk jug that includes a handle and a dispensing opening that has an external threaded surface. However, other liquids, such as but not limited to orange juice, non-dairy milk, tea, water-based flavoring, apple juice, etc. could be used and would come in a similar storage container. The container 16 shown in FIG. 2 is the original container in which the liquid is typically sold and shipped. The container 16 includes a cap or cover that is removed from the threaded dispensing opening for pouring of the liquid from the container and re-attached for storage after opening. It is contemplated that the original container 16 could be glass, plastic or other material such as Tetra Pak multi-layer packaging, and that the original container could be either rigid or flexible.

Figure 3:
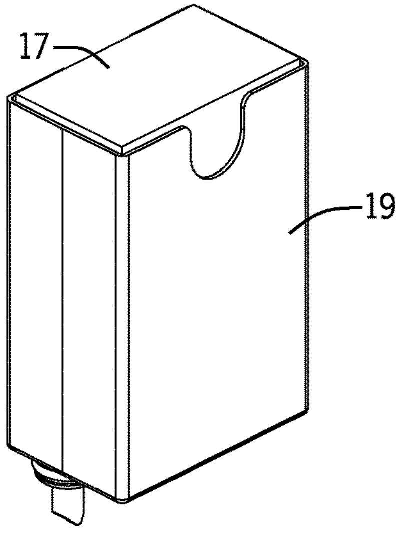
FIG. 3 is a perspective view of a first alternate type of liquid container that can be used with the liquid dispenser of the present disclosure.

FIG. 3 illustrates a flexible package 17 that is supported by an external support 19. Such a package 17 includes a dispensing opening that can be used with the positive pressure valve assembly and liquid dispenser of the present disclosure.

In the embodiment shown in FIG. 2, the container 16 is inverted and received within a loading tray 18 that is sized and configured to position the inverted container 16 in the correct position within the open interior 14 of the cabinet 20 of the liquid dispenser 10. The loading tray 18 includes an alignment aid to correctly position the loading tray 18 and the container such that liquid can be dispensed from the container 16 out of the liquid dispenser 10. The loading tray 18 can be formed of various materials, such as plastic or nylon.

Figure 5:
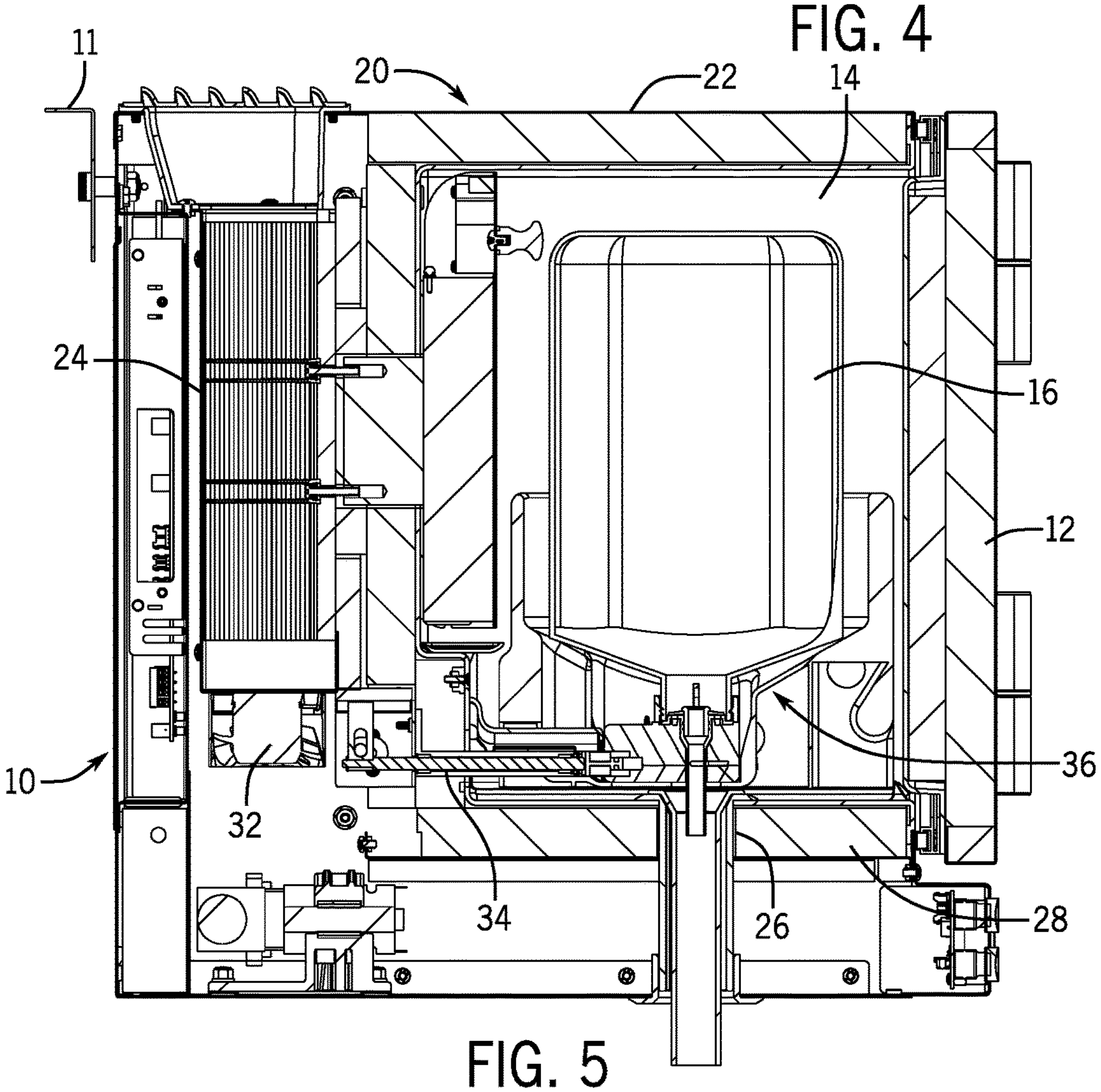
FIG. 5 is a section view taken along line 5-5 of FIG. 1 showing the position of a liquid container within the liquid dispenser ready for dispensing.

As shown in FIG. 5, the cabinet 20 includes insulated side walls, a top wall 22 and a movable door 12 to aid in keeping the open interior 14 at a desired temperature. In the embodiment illustrated, the liquid dispenser 10 includes an air cooler 24 mounted within the open interior 14. The air cooler 24 is connected to a power supply unit and is operable to cool the open interior 14 to a desired temperature set by a user and controlled by a controller of the liquid dispenser 10. The air cooler 24 includes a compressor and fan that operate in a conventional manner to create a cooled supply of air that circulates within the open interior 14 to maintain the liquid in the container 16 at a desired temperature. Although the liquid dispenser 10 shown in FIG. 5 includes the air cooler 24, it is contemplated that the air cooler 24 could be eliminated and the insulated walls of the cabinet 20 would slow the warming of the previously refrigerated liquid within the container 16.

Figure 6:
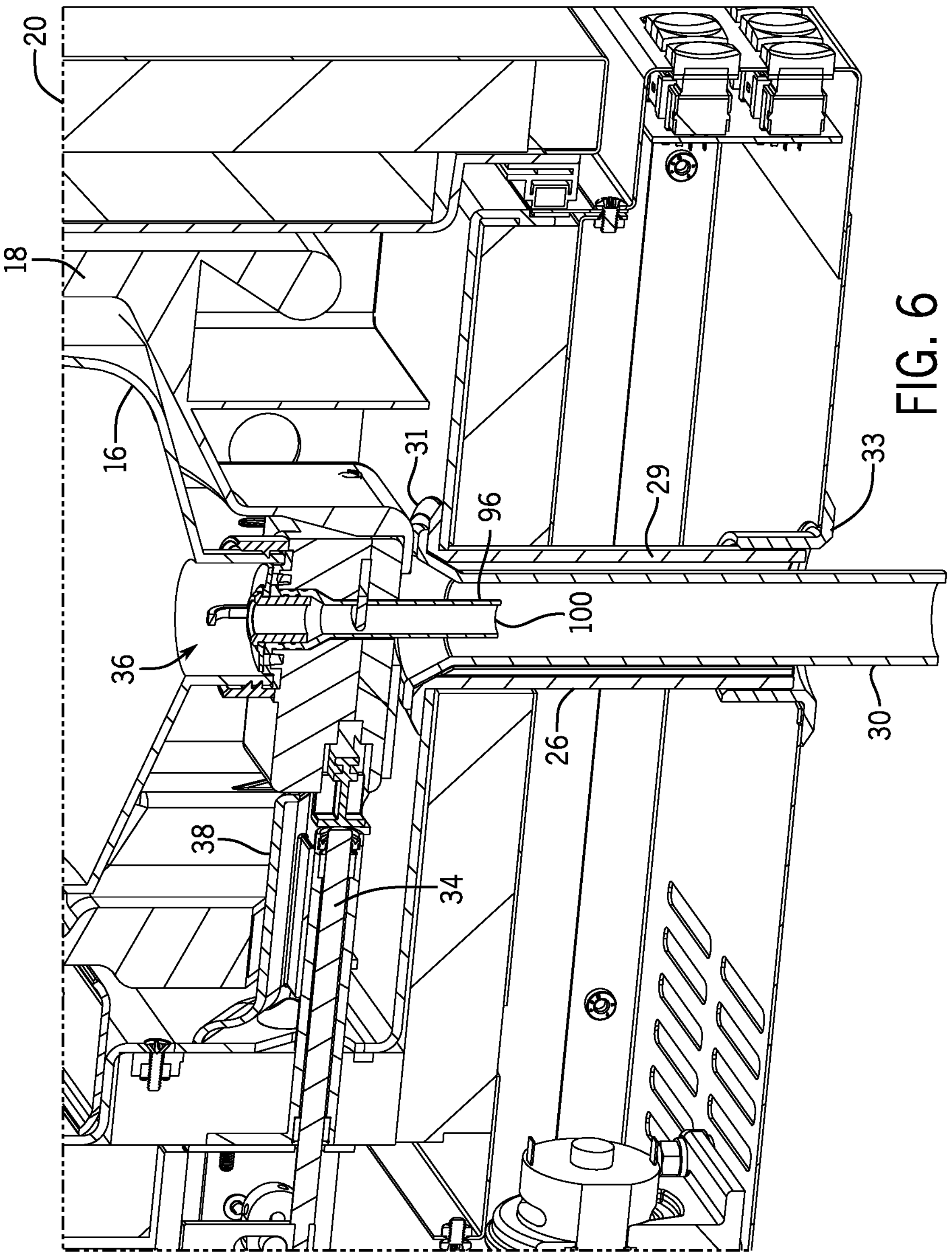
FIG. 6 is a magnified view of FIG. 5 showing the interaction between the liquid dispenser and the positive pressure valve assembly mounted to the liquid container.

As shown in the magnified section view of FIG. 6, the loading tray 18 positions the container 16 in alignment with dispensing opening 26 formed in a bottom wall of the cabinet 20. A fixed outer shroud 29 extends between an upper collar 31 and a lower collar 33 to define an open passageway to the exterior of the cabinet. A replaceable dispensing sprout 30 extends through the outer shroud 29 and provides the dispensing location for the liquid as the liquid is dispensed from the container 16. The dispensing spout 30 can be easily removed and cleaned as needed while the shroud 29 remains in place. The dispensing spout 30 could also be disposable to reduce the amount of labor required for cleaning.

In addition to the air cooler 24, the liquid dispenser 10 includes an air producer 32 that is operable to create an air flow that is provided to the interior of the container 16 in a manner to be described in greater detail below. In the embodiment illustrated, the air producer 32 is a fan that is driven by an electric motor to create an air flow. The air producer 32 can be operated to create a pressurized air flow. In other contemplated embodiments, the air producer 32 could be eliminated and not form part of the liquid dispenser 10.

The liquid dispenser 10 further includes a valve actuator 34 that is connected to a drive motor (not shown) and is used to selectively open and close a positive pressure valve assembly that is mounted to the container 16 to control the dispensing of the liquid from the container 16. The valve actuator 34 in the embodiment illustrated is an element that is movable in a linear direction to control the opening and closing of the valve assembly 36 in a manner to be described in much greater detail below. However, the valve actuator 34 could have other configurations as long as the valve actuator 34 is movable to adjust the position of a valve assembly.

Referring to FIG. 6, both the valve actuator 34 and an air flow connector of the liquid dispenser are located within an alignment shroud 38 that extends into the open interior 14 of the cabinet 20. The alignment shroud 38 protects both the valve actuator 34 and the air flow connector. In addition, the alignment shroud 38 provides a point of connection between the valve actuator 34 and the air flow connector in the cabinet with the positive pressure valve assembly mounted to the container 16 when the container is supported in the inverted position by the loading tray 18. The loading tray 18 is configured to receive the shroud 38 as the loading tray 18 is moved into the cabinet and to provide the required alignment with the positive pressure valve assembly 36.

Figure 7:
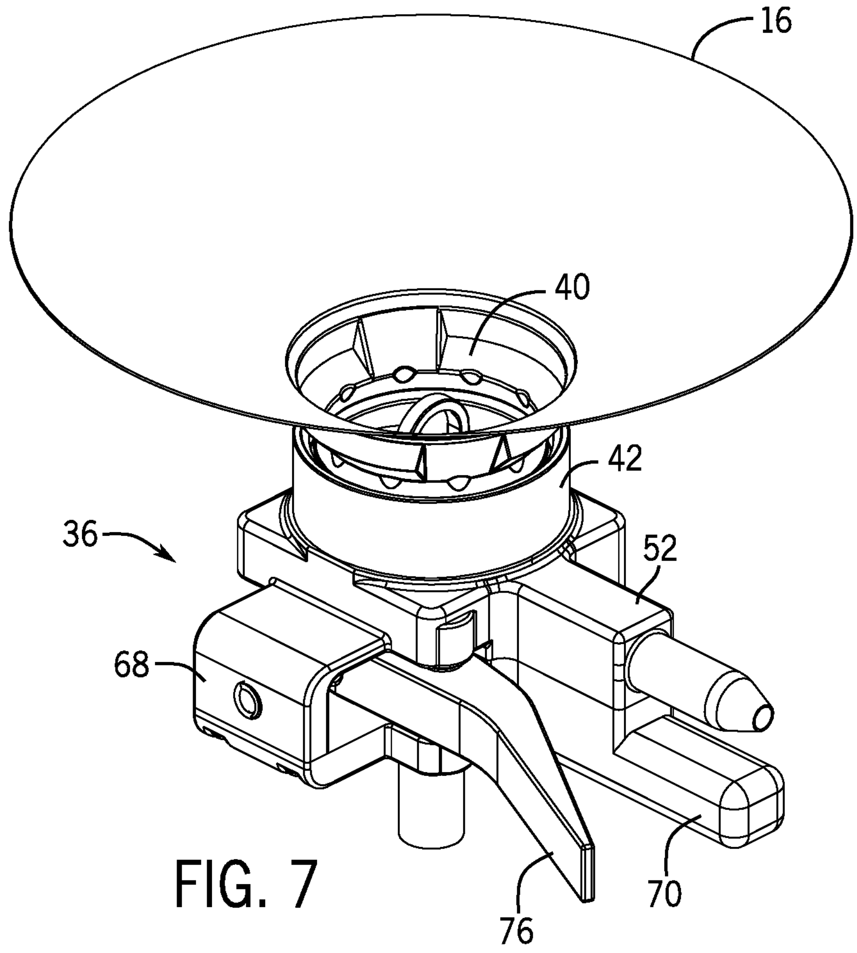
FIG. 7 is a perspective view of a first embodiment of the positive pressure valve assembly of the present disclosure mounted to the liquid container.

FIGS. 7-11 illustrate a first embodiment of the positive pressure valve assembly 36 of the present disclosure. FIG. 7 shows the positive pressure valve assembly 36 mounted to the dispensing opening 40 of the container 16, which is only partially shown to facilitate better understanding. In the embodiment illustrated, the dispensing opening 40 of the container 16 includes a spout having a series of external threads that are designed to receive and retain a cap of the container 16 in a conventional manner. The series of external threads on the dispensing opening 40 of the container 16 provide a point of attachment for the positive pressure valve assembly 36. In this manner, the original container for the liquid being dispensed can be used and no other vessel is required to hold the liquid. Thus, once the liquid from the container 16 has been completely dispensed, the positive pressure valve assembly 36 can be removed and the container 16 can be discarded.

Figure 8:
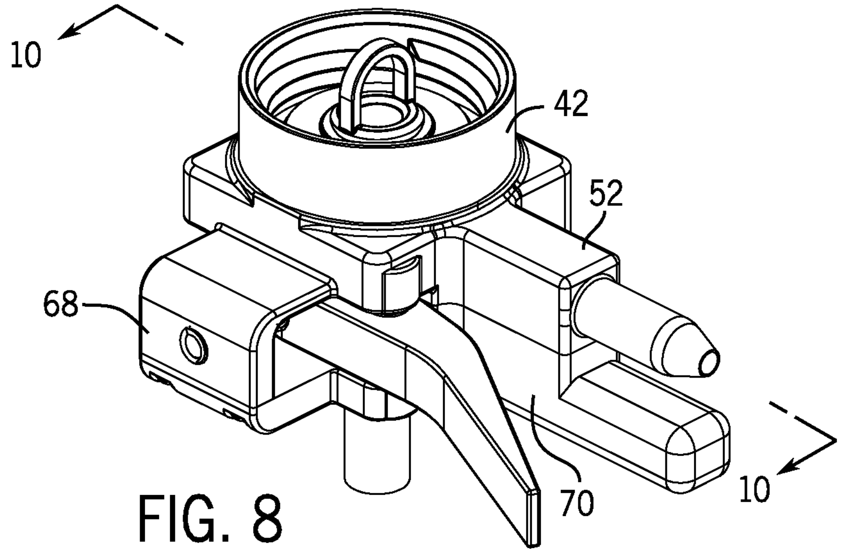
FIG. 8 is a perspective view of the positive pressure valve assembly of FIG. 7.
Figure 9:
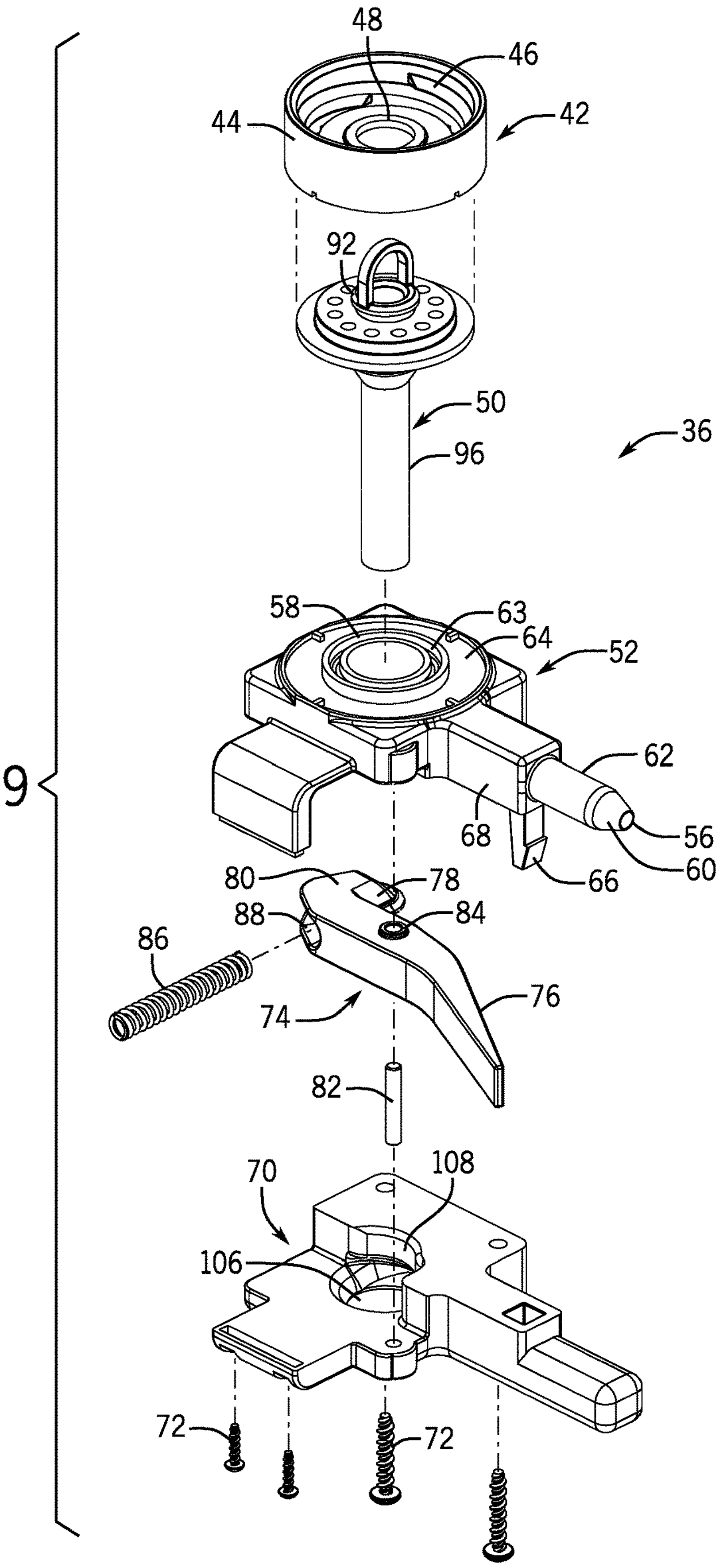
FIG. 9 is an exploded view of the first embodiment of the positive pressure valve assembly.

As shown in FIGS. 8 and 9, the positive pressure valve assembly 36 includes an engagement collar 42 that includes an outer wall 44 having a series of internal threads 46. The internal threads 46 are configured to engage and mate with the external threads on the dispensing opening of the container. The engagement collar 42 includes a central opening 48 that is designed to receive a dispensing tube 50.

Figure 10:
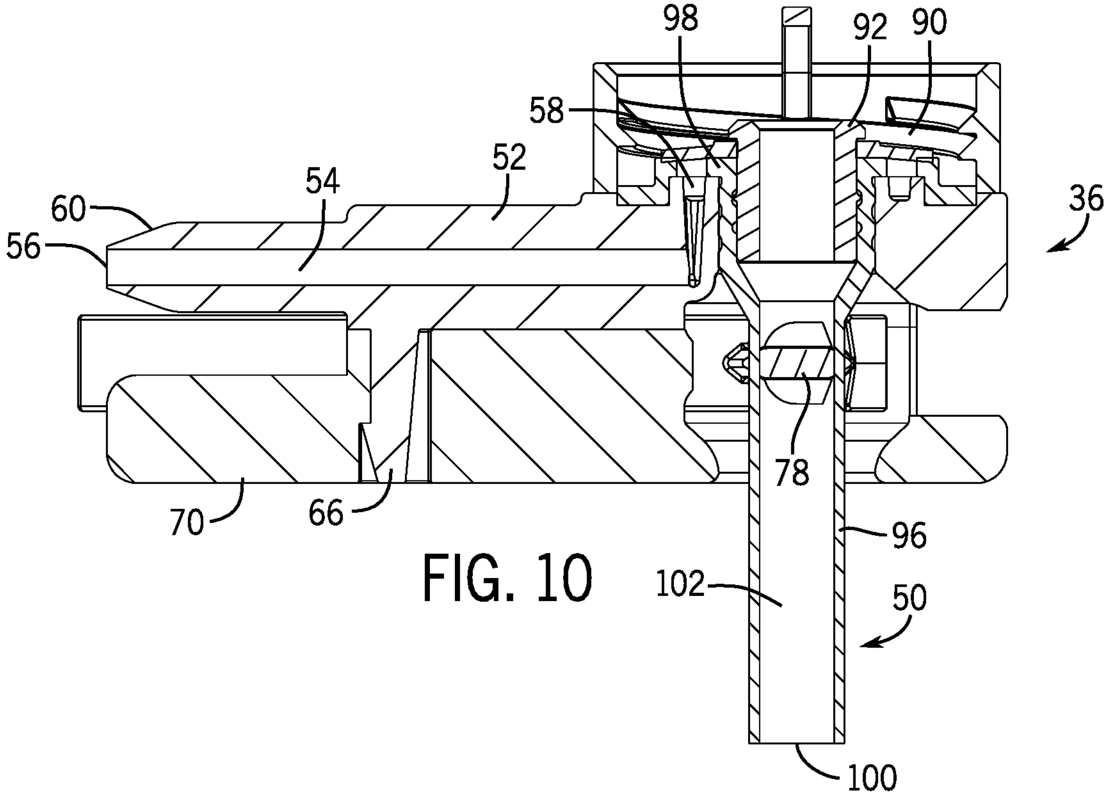
FIG. 10 is a section view taken along line 10-10 of FIG. 8.

The positive pressure valve assembly 36 further includes an air supply member 52 that is a molded plastic component. The air supply member 52, as shown in FIGS. 9 and 10, includes an air flow passageway 54 that extend from an air inlet 56 to an air outlet 58. The air inlet 56 is located on a tapered alignment end 60 formed on a connection tube portion 62. The alignment end 60 and connection tube portion 62 are configured to allow the positive pressure valve assembly 36 to engage with the air producer located within the cabinet such that the air flow created by the air producer 32 is received within the air flow passageway 54 of the air supply member 52.

As shown in FIG. 9, the air outlet 58 formed in the air supply member 52 feeds into an annular channel 63 that distributes the air flow for introduction into the interior of the container as will be described below. The air supply member 52 includes a mounting platform 64 that is in contact with an outer lip of the dispensing opening of the container when the container is connected to the positive pressure valve assembly.

The air supply member 52 further includes a connection finger 66 and mounting flange 68 that aid in connecting the air supply member 52 to a valve base member 70. The valve base member 70 is further connected to the air supply member 52 by a series of connectors 72. As shown in FIGS. 8 and 9, a flow restrictor 74 is mounted between the valve base member 70 and the air supply member 52. The flow restrictor 74 includes an extended handle 76 and a discharge tube engagement portion 78 formed on an end 80 opposite the handle 76. The flow restrictor 74 is pivotably mounted between the valve base member 70 and the air supply member 52 about a pivot pin 82 that extends through a pivot hole 84 in the handle 76. In this manner, when a force is applied to the handle 76, the end 80 and discharge tube engagement portion 78 will move toward and away from the dispensing tube to selectively open and close the dispensing tube.

As shown in FIG. 9, a bias spring 86 is designed to be positioned between the flange 68 of the air supply member 52 and a spring slot 88 formed in the flow restrictor 74. The bias spring 86 is compressed in the static condition of the positive pressure valve assembly 36 such that the tube engagement portion 78 is biased into a position to close the discharge tube. Such biased position prevent unwanted discharge of the liquid from the container 16. When a linear force is applied to the handle 76, the opposite end of the flow restrictor 74 pivots against the bias force created by the bias spring 86 and the dispensing tube is opened to allow the flow of liquid from the container. Thus, the flow restrictor 74 is in a normally closed position and must be moved away from the normally closed position.

Figure 11:
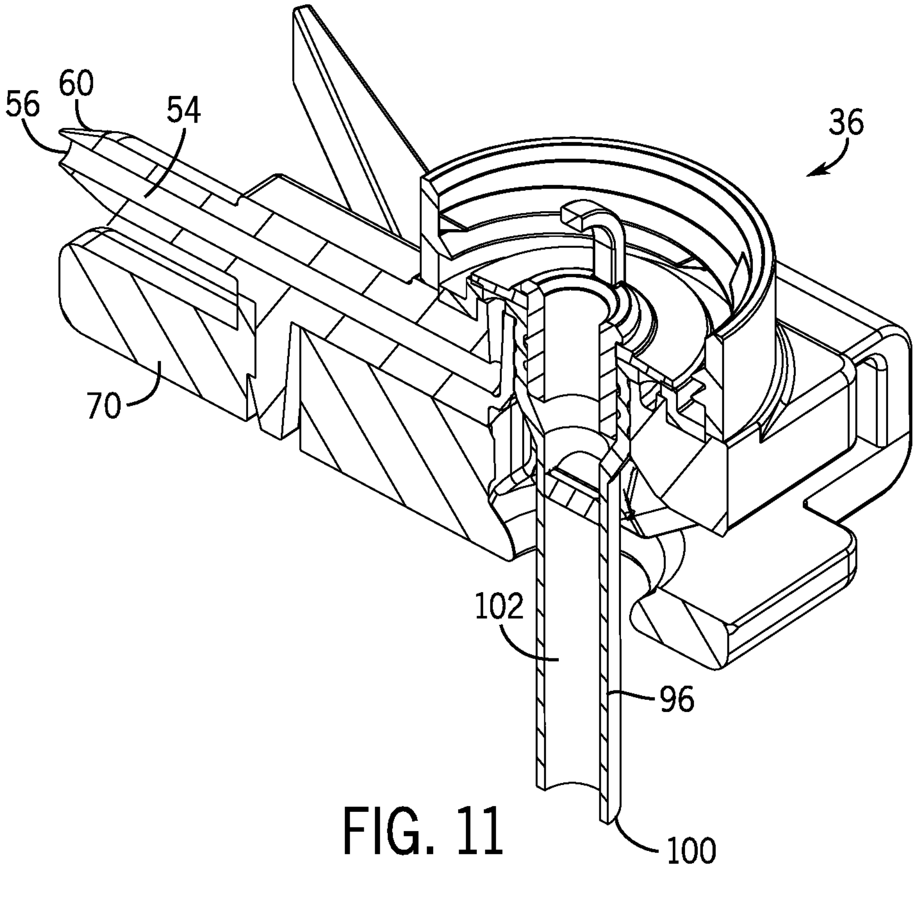
FIG. 11 is a section view similar to FIG. 10.
Figure 12:
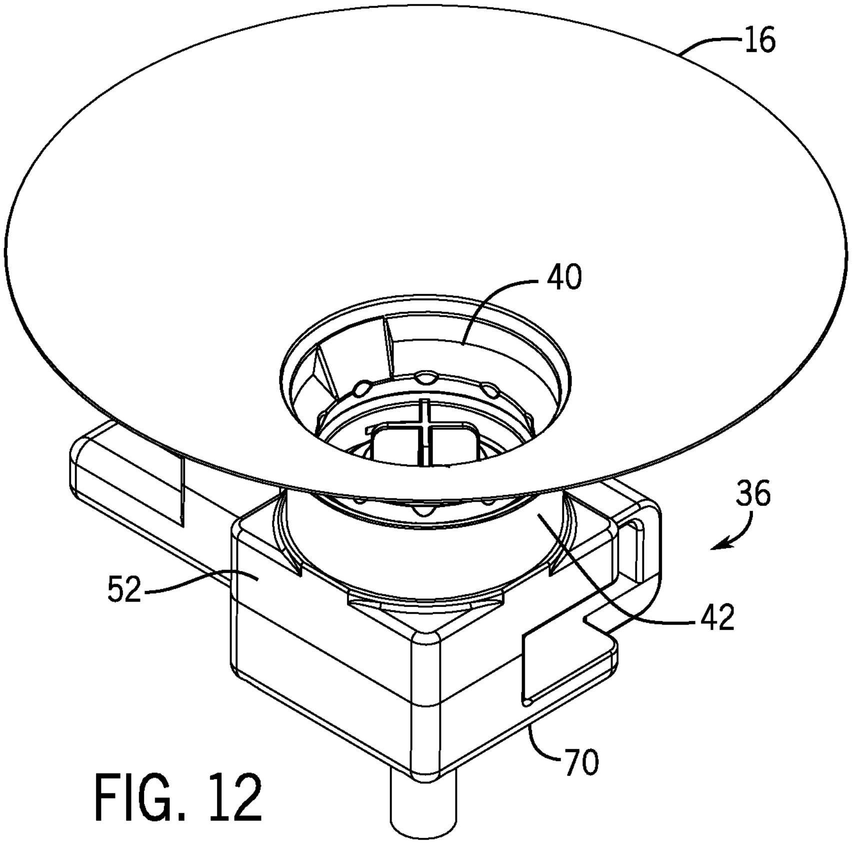
FIG. 12 is a perspective view of a second embodiment of the positive pressure valve assembly of the present disclosure mounted to the liquid container.
Figure 13:
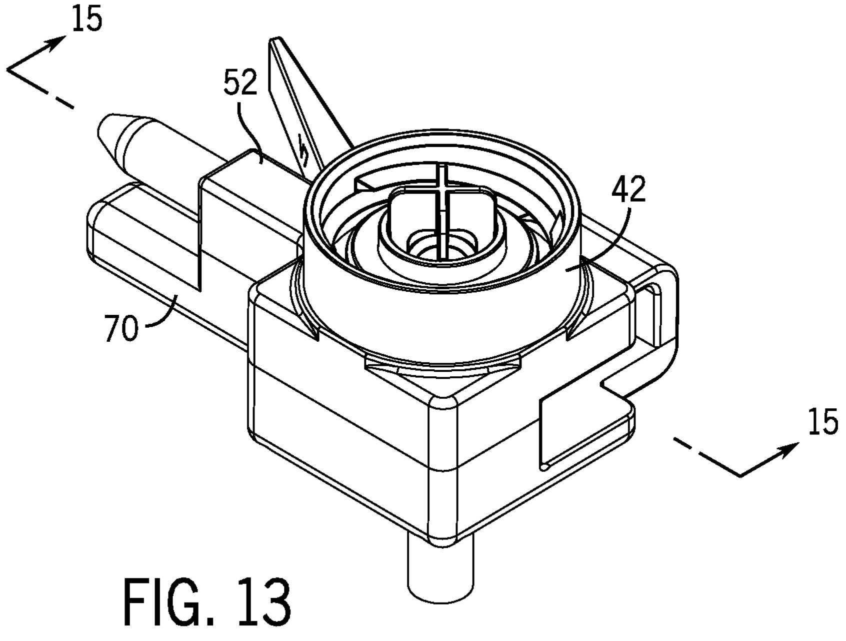
FIG. 13 is a perspective view of the positive pressure valve assembly of FIG. 12.

Referring now to FIGS. 10 and 11, the positive pressure valve assembly 36 includes a flap valve member 90 that is positioned between a center plug 92 and an outer rim 94 of the dispensing tube 50. The flap valve member 90 acts as a one-way valve when a container of liquid is attached to the positive pressure valve assembly and inverted. The pressure created by the volume of liquid above the flap valve member 90 keeps the flap valve member 90 closed during normal conditions. When an positive pressure air flow is provided in the air flow passageway 54 and the pressure of the air flow exceeds the liquid pressure in the container, the one-way valve created by the flap valve member 90 opens to allow air to flow into the open interior of the container. In this manner, a positive pressure is maintained above the liquid supply within the container as fluid is being dispensed from the container, which allows for a smooth, predictable flow rate of liquid due do gravity.

As shown in FIGS. 9-11, the dispensing tube 50 includes an extended, tubular sleeve 96 that extends from an upper first end 98 to a lower, second dispensing end 100. The tubular sleeve 96 is formed from a flexible material, such as rubber or silicone, that can be repeatedly compressed and released without causing damage or fatigue. When the positive pressure valve assembly 36 is assembled, the tubular sleeve 96 extends through a center opening 104 in the air supply member 52 and an aligned center opening 106 formed in the valve base 70. The tube engagement portion 78 is movable to compress the sleeve 96 against a wall 108 formed on the valve vase 70. When the tubular sleeve 96 is fully compressed by the tubular engagement portion 78 of the flow restrictor, fluid is prevented from traveling through the liquid passageway 102 to the discharge end 100. When the flow restrictor pivots against the bias force, the tube engagement portion moves away from the tubular sleeve 96 and the sleeve opens. In this manner, the pivoting movement of the flow restrictor 74 can control the amount of liquid that is discharged from the liquid dispenser of the present disclosure.

Figure 14:
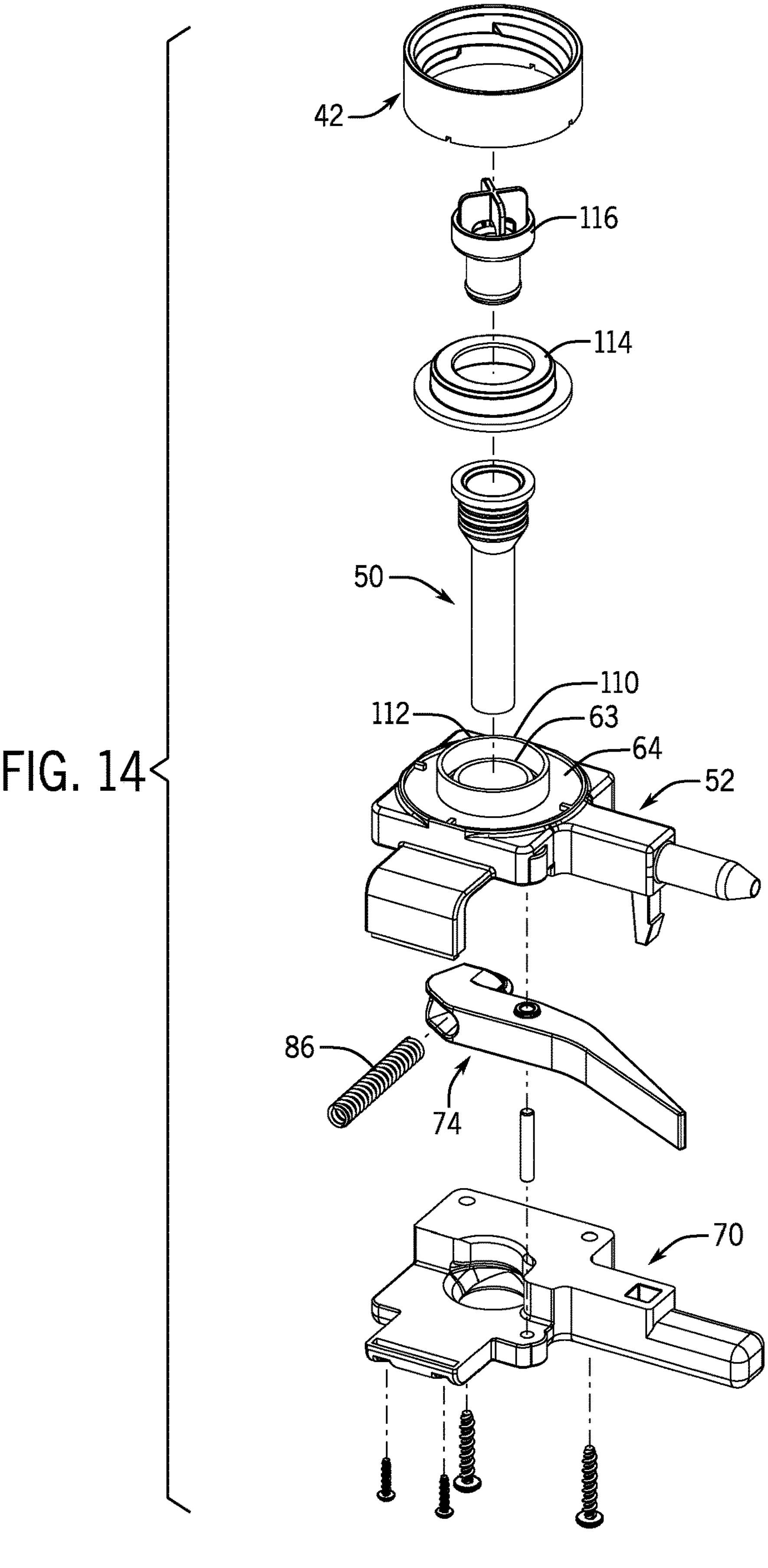
FIG. 14 is an exploded view of the second embodiment of the positive pressure valve assembly.
Figure 15:
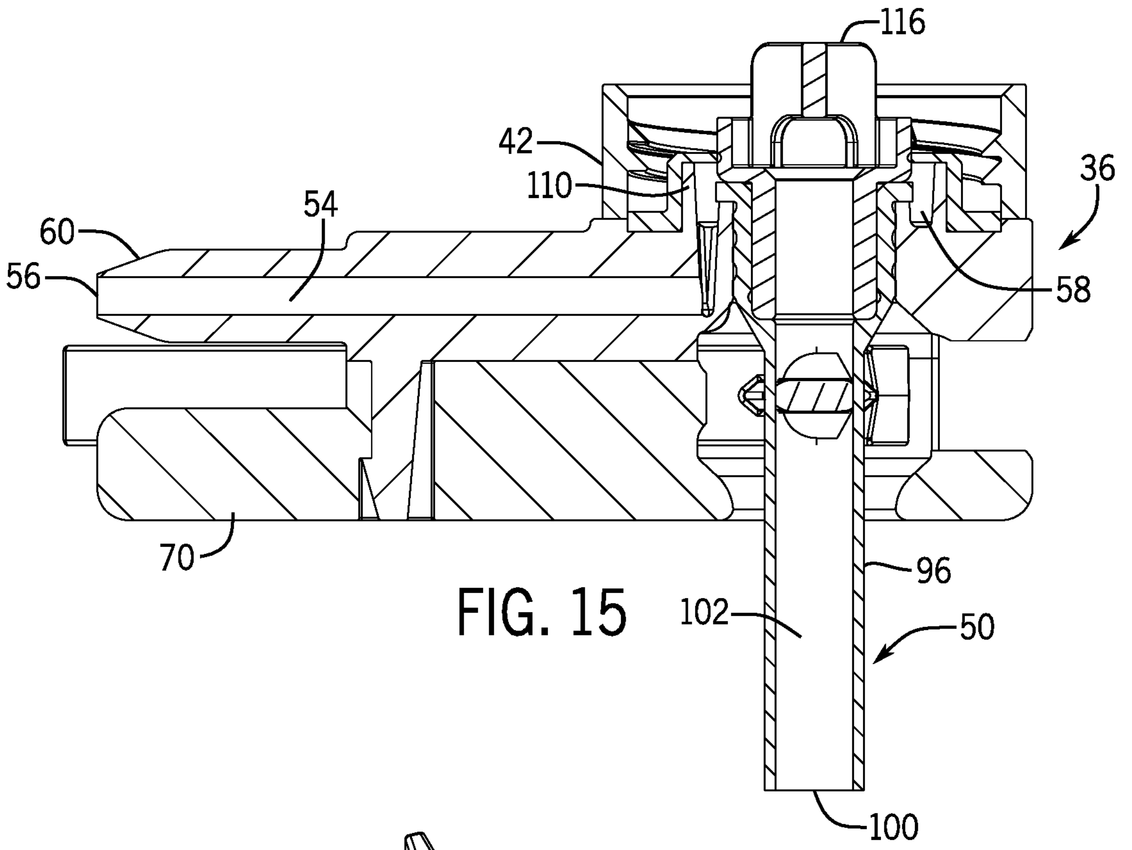
FIG. 15 is a section view taken along line 15-15 of FIG. 13.
Figure 16:
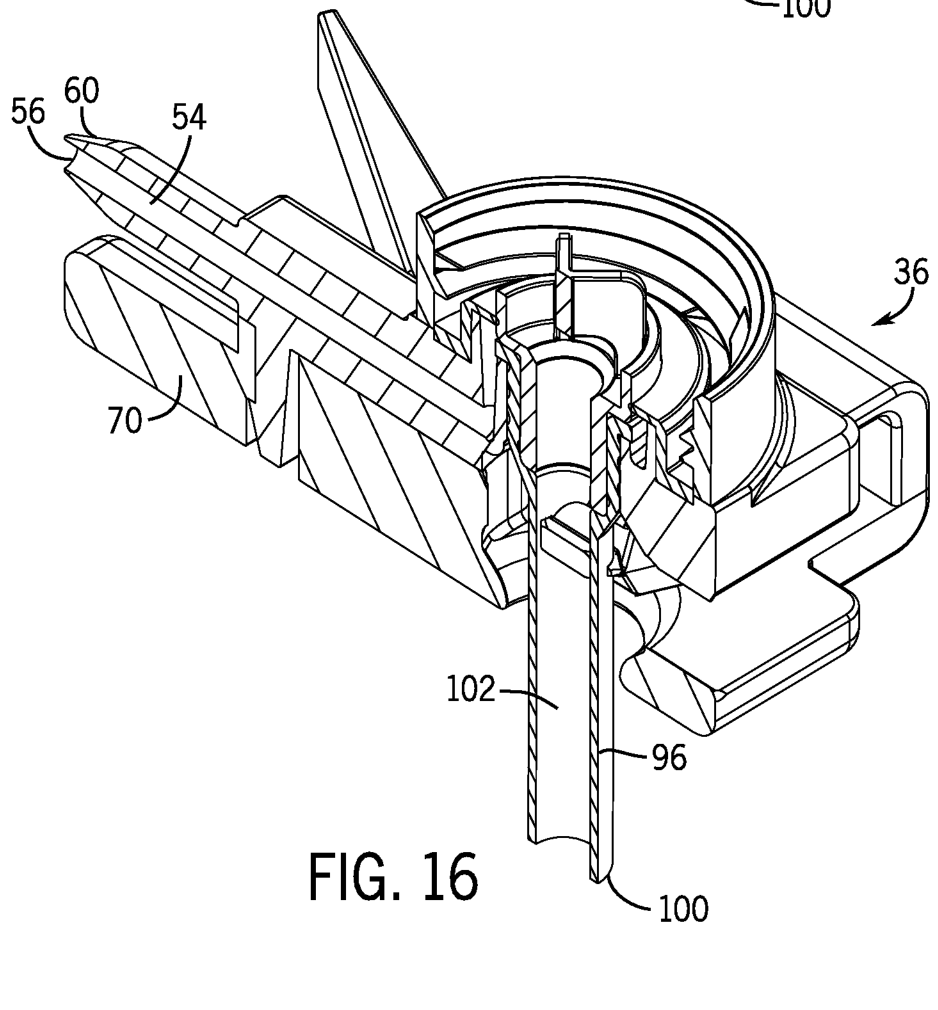
FIG. 16 is a section view of the second embodiment similar to FIG. 15.

FIGS. 12-16 illustrate a second contemplated embodiment of the positive pressure valve assembly 36 of the present disclosure. The second embodiment includes many common components with the first embodiment and these common components will not be discussed and are shown with the same reference numbers. As shown in FIG. 14, the mounting platform 64 of the air supply member 52 includes an expanded height outer lip 110 and a reduced height inner lip 112. The inner lip 112 and outer lip 110 define a similar air flow channel 63 that receives the air flow from the air flow supply device as described previously. In the second embodiment shown, the flap valve of the first embodiment is replaced with a lip valve 114, which again functions as a one-way valve to only allow the flow of air into the open interior of the container as liquid is dispensed. The lip valve 114 is formed from a flexible silicone material which is food safe and flexible. The lip valve 114 receives a plug member 116 that is received in the upper end of the discharge tube 50. The lip valve 114 is held in a closed position by the weight of the liquid and only opens when the pressure of the air flow is sufficient to overcome the weight of the liquid.

Figure 17:
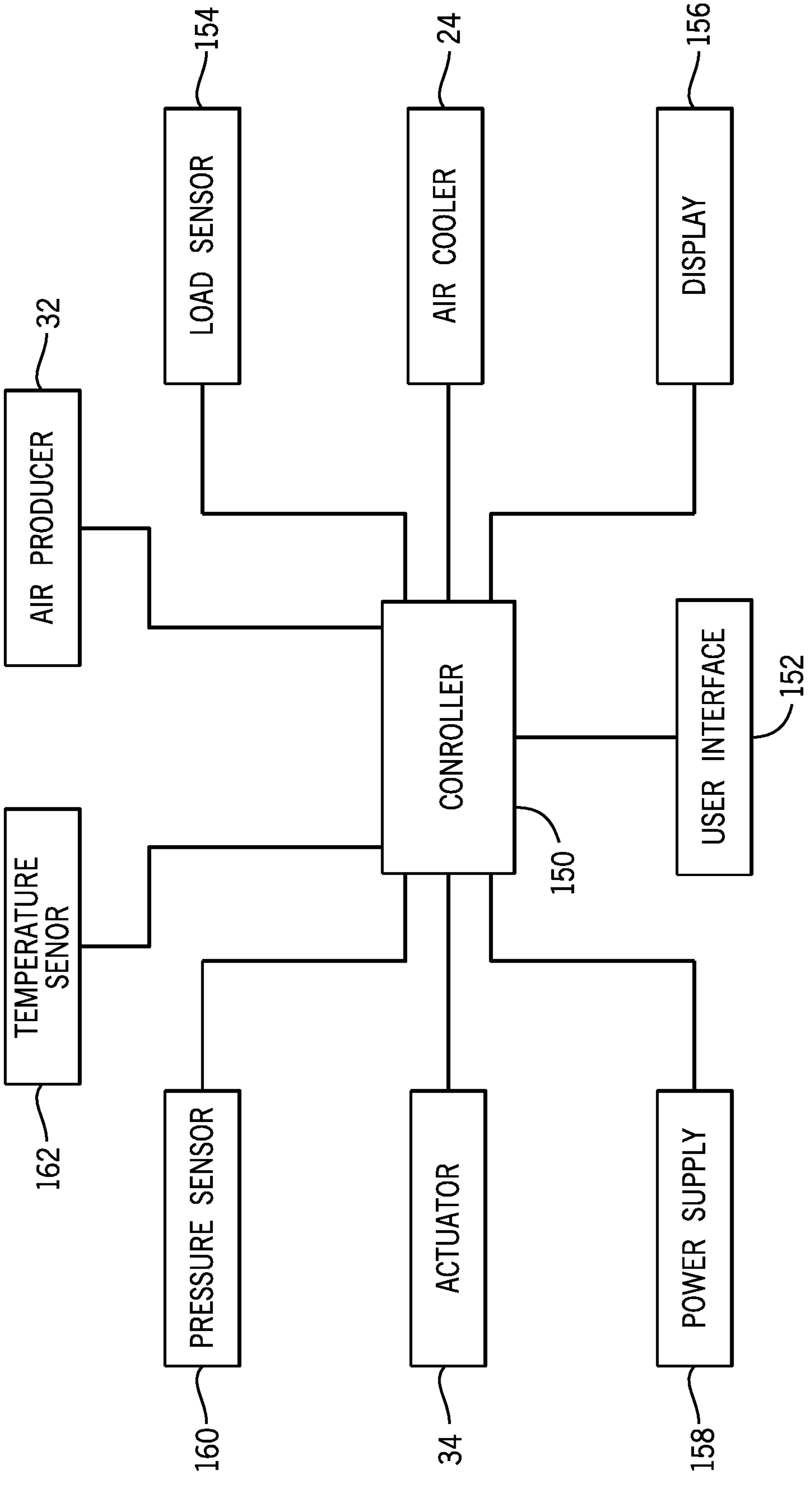
FIG. 17 is an electrical schematic of the operating components of the liquid dispenser.

FIG. 17 is a schematic illustration of the components required to operate the liquid dispenser 10. The liquid dispenser 10 can include a controller 150 that controls the discharge volume of the liquid from the inverted container. In one contemplated embodiment, the controller 150 would target a discharge rate of 2.5 oz/second or something similar. The liquid dispenser 10 could include a series of push buttons on a user interface 152 to allow the operator to select between preset volumes of liquid being dispensed. The user interface 152 could also be a touch screen that allows for different configurations of interface areas and information. In one contemplated embodiment of the present disclosure, the liquid dispenser 10 could include load sensors 154 that are positioned to determine the weight of the storage container and the contained liquid. As liquid is dispensed, the changing weight of the storage container will provide an indication of the amount of liquid dispensed and the amount of liquid remaining in the container. In this manner, the controller 150 will able to accurately meter the amount of liquid dispensed to control the amount of liquid added to a food item, such as coffee, tea or a smoothie.

As shown in FIG. 17, the liquid dispenser 10 can include a display 156, which could be a display panel or a series of indicator lights, that can indicate when the container in the cabinet is nearing empty or needs to be replaced. The indicator on the display 156 could be triggered by the weight of the storage container, the accumulated volume dispensed since the storage container was installed or some type of optical measurement of the liquid in the container. Such system would allow a staff member to plan for when the storage container need to be changed before the storage container is completely emptied.

The controller 150 is shown in FIG. 17 as being connected to a power supply 158 that in turn is connected to an outlet near the location of the liquid dispenser. The controller 150 is operable to control the operation of the air cooler 24, the air producer 32 and the actuator 34. In addition, the controller 150 receives operating information from a series of sensors, which can include any one or any combination of a load sensor 154, an air pressure sensor 160 and a temperature sensor 162. A load cell could be utilized as the load sensor 154 to help determine the volume of liquid remaining in the container during dispensing of the liquid.

In the embodiments described, the original container for the liquid being dispensed includes a rigid outer wall. As liquid is dispensed, the volume of the area above the volume of liquid increases as the liquid is being dispensed. For gravity to effectively force the liquid out of the container at a known rate, a supply of air must be provided to the open area above the supply of liquid.

Figure 4:
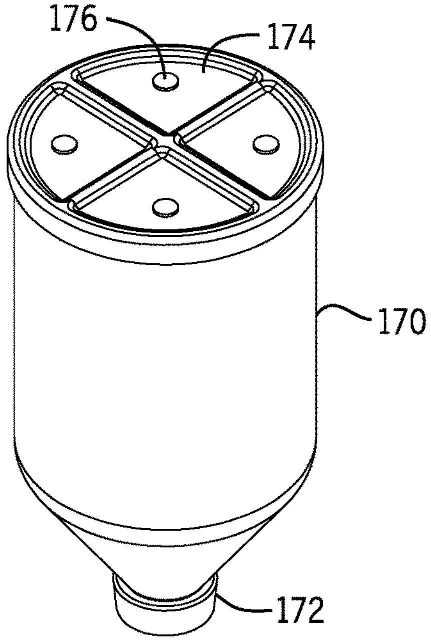
FIG. 4 is a perspective view of a second alternate type of liquid container that can be used with the liquid dispenser of the present disclosure.

It is also contemplated that other containers, such as shown in FIG. 4, could be utilized. The container 170 shown in FIG. 4 includes a dispensing opening 172 similar to the containers being discussed. However, the bottom wall 174 includes a series of one-way valves 176 that vent the interior of the container to atmosphere. If such a container 170 is used, the valves 176 will open as the liquid is dispensed and will thus maintain the pressure in the container at atmospheric pressure. If such a container 170 is used, the liquid dispenser would not need to create an air flow that is directed into the container though the dispensing opening.

The operation of the liquid dispenser 10 in dispensing liquid according to the subject matter of the present disclosure will now be presented with reference to the drawings Figures. Initially, one of the two embodiments of the positive pressure valve assemblies 36 are attached to the container 16 of liquid to be dispensed by utilizing the threaded collar 42 to engage the valve assembly with the threaded dispensing opening of the container 16. The initial attachment occurs when the container is positioned upright such that the dispensing opening of the container is located above the container body. In the initial upright position before installation, the flow restrictor is biased into a position to close the dispensing tube. Thus, when the container is inverted and installed within the loading tray 18 as shown in FIG. 2, liquid will not leave the container.

Once the container and positive pressure valve assembly are inserted into the loading tray 18 as shown in FIG. 2, the loading tray 18 is moved into the open interior 14 of the cabinet 20. As the loading tray 18 is moved into the open interior 14, the shroud 38 helps to guide the proper engagement between the air producer and the actuator of the cabinet with the air supply member and flow restrictor of the positive pressure valve assembly. Once in the proper position, the actuator 34 is in contact with the handle 76 of the flow restrictor 74 and the air flow from the air producer is in fluid communication with the air flow passageway 54.

During the movement of the loading tray 18, the flexible sleeve 96 is received within the dispensing spout 30, as shown in FIG. 6. The tapered shape of the upper collar 31 helps to guide the flexible sleeve 96 during the initial installation process.

Once the container 16 is in the loaded position shown, the controller 150 can operate the air producer 32 to pressurize the interior of the container to a desired pressure. It is contemplated that the initial pressure in the container will be approximately 0.6-0.8 psi to create a positive pressure in the container. The pressure of the air flow from the air producer will overcome the pressure on the one-way valve due to the liquid to allow the air flow to enter the container and bubble up through the liquid to the upper portion of the container, which is in an inverted position. The controller 150 stops the operation of the air producer when the desired pressure in the container 16 is reached.

The controller 150 also monitors the temperature in the open interior of the enclosure and operates the air cooler 24 to achieve the desired temperature for the container of liquid. The desired temperature can be set by a user or operator utilizing the user interface device 152 or can be pre-set.

The controller 150 continuously monitors for the operation of the user interface 152. If a user or operator desires to dispense liquid from the container, the user can depress one of a series of buttons or a labeled locations on a touch screen. The user interface 152 can be configured in any way to provide the desired number of input for the user.

If the user wishes to dispense a volume of liquid, the controller 150 move the actuator 34 shown in FIG. 6. The movement of the actuator 34 will move the handle 76 of the flow restrictor 74 against the bias force created by the bias spring 86. This movement will move the tube engagement portion 78 away from the flexible dispensing tube 50, thereby allowing the flow of liquid from the container 16 due to the influence of gravity. The rate at which fluid is dispensed is dictated by the size of the dispensing tube and the pressure of air within the container above the volume of liquid in the container. The controller 150 allows the dispensing tube to remain open for the time needed to dispense the selected volume of liquid. Once this time has passed, the actuator 34 is moved away from handle and the bias spring again causes the flow restrictor to prevent liquid from flowing from the container.

As the liquid is being dispensed, the controller 150 activates the air producer 32 to supply air flow into the container though the one-way valve at the interface between the dispensing opening of the container and the positive pressure valve assembly. The controller operates the air producer 32 to maintain the pressure within the container as the liquid is being dispensed. Maintaining the pressure in the container during dispensing creates a smooth flow of liquid at a known flow rate. In this manner, the fluid dispenser can accurately dispense fluid and can control the volume of liquid dispensed.

This process continues until all of the liquid has been dispensed from the container. Once the container is empty, the loading tray 18 and container are removed from within the cabinet. The container 16 can then be removed from the loading tray and the positive pressure valve assembly can be detached from the empty container 16. The empty container 16 can be discarded as normal and the positive pressure valve assembly is installed in another full container 16. In this manner, full containers can be stored as is typical and once ready, the container including the liquid is attached to the positive pressure valve assembly and inserted into the liquid dispenser 10.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A positive pressure valve assembly for use with a container having a main body for storing a supply of a liquid to be dispensed and a dispensing opening, the positive pressure valve assembly comprising:

- an engagement collar sized to be securely attached to the dispensing opening of the container;
- a dispensing tube extending from the engagement collar and including a liquid passageway;
- a flow restrictor positioned to control a flow of the liquid out of the dispensing tube;
- a one-way valve positioned in the engagement collar to allow air flow into an open interior of the main body as the liquid is dispensed; and
- an air supply member having an air flow passageway including an air inlet and an air outlet in communication with the one-way valve, wherein the dispensing tube extends through the air supply member when the positive pressure valve assembly is mounted to the container.

2. The positive pressure valve assembly of claim 1 wherein the dispensing tube is flexible and the flow restrictor is movable to compress the dispensing tube into a closed position.

3. The positive pressure valve assembly of claim 1 wherein the engagement collar includes a series of threads that engage a corresponding series of threads on the dispensing opening to retain the positive pressure valve assembly on the container.

4. The positive pressure valve assembly of claim 1, wherein the air inlet is configured to receive a supply of air and the air outlet is positioned to deliver the supply of air to the one-way valve.

5. The positive pressure valve assembly of claim 4 wherein the supply of air is a pressurized supply of air.

6. The positive pressure valve assembly of claim 4 wherein the air outlet includes a circular groove in communication with the one-way valve.

7. The positive pressure valve assembly of claim 4 further comprising a valve base coupled to the air supply member, wherein the flow restrictor is pivotably mounted between the valve base and the air supply member.

8. The positive pressure valve assembly of claim 7 further comprising a bias spring positioned to bias the flow restrictor into a position to close the dispensing tube.

9. The positive pressure valve assembly of claim 4 wherein the air supply member includes a center opening, wherein the dispensing tube extends through the center opening when the positive pressure valve assembly is mounted to the container.

10. A liquid dispenser for dispensing a liquid from a container for the liquid that includes a main body and a dispensing opening, comprising:

a cabinet sized to receive the container;

a positive pressure valve assembly secured to the dispensing opening of the container, the positive pressure valve assembly comprising:

an engagement collar sized to be securely attached to the dispensing opening of the container;

a dispensing tube extending from the engagement collar and including a liquid passageway;

a flow restrictor that is configured to move between open and closed configurations;

a one-way valve positioned in the engagement collar to allow air flow into an open interior of the main body as the liquid is dispensed; and an air supply member having an air flow passageway including an air inlet and an air outlet in communication with the one-way valve;

an air producer operable to direct an air flow into the air inlet of the air supply member; and a controller operable to activate the air producer and to actuate the flow restrictor between the open and closed configurations.

11. The liquid dispenser of claim 10 wherein the dispensing tube is flexible and the flow restrictor is movable to compress the dispensing tube into a closed position.

12. The liquid dispenser of claim 10 wherein the operation of the air producer creates the air flow having a positive pressure to open the one-way valve.

13. The liquid dispenser of claim 10 further comprising a valve actuator operable to move the flow restrictor and a bias spring positioned to bias the flow restrictor into a position to close the dispensing tube.

14. The liquid dispenser of claim 10 wherein the air supply member includes a center opening, wherein the dispensing tube extends through the center opening when the positive pressure valve assembly is mounted to the container.

15. The liquid dispenser of claim 14 further comprising a valve base coupled to the air supply member, wherein the valve base includes a center opening aligned with the center opening of the air supply member such that the dispensing tube extends through the pair of aligned center openings, wherein the flow restrictor is pivotably mounted between the valve base and the air supply member.

16. The liquid dispenser of claim 10 further comprising a heat exchanger located within the cabinet and operable to cool an interior of the cabinet below ambient temperature.

17. A liquid dispenser for dispensing liquid directly from a container for the liquid that includes a main body and a dispensing opening, comprising:

a cabinet sized to receive the container;

a positive pressure valve assembly secured to the dispensing opening of the container, the valve assembly comprising:

an engagement collar sized to be securely attached to the dispensing opening of the container;

a dispensing tube extending from the engagement collar;

a flow restrictor positioned to selectively open and close the dispensing tube to control a flow of the liquid out of the dispensing tube; and an air supply member in communication with the dispensing opening of the container, wherein the air supply member includes a center opening, wherein the dispensing tube extends through the center opening when the positive pressure valve assembly is mounted to the container;

wherein the flow restrictor is operable to control the discharge of the liquid and the air supply member provides air flow into the main body of the container as the liquid is dispensed.

18. The liquid dispenser of claim 17 wherein the dispensing tube is flexible and the flow restrictor is movable to compress the dispensing tube into a closed position.

19. The liquid dispenser of claim 17 further comprising a valve actuator operable to move the flow restrictor and a bias spring positioned to bias the flow restrictor into a position to close the dispensing tube.

20. The liquid dispenser of claim 17 further comprising a valve base coupled to the air supply member, wherein the flow restrictor is pivotably mounted between the valve base and the air supply member.

21. A liquid dispenser for dispensing liquid directly from a container for the liquid that includes a main body and a dispensing opening, comprising:

a positive pressure valve assembly that includes an air supply member in communication with the dispensing opening of the container;

an air cooler that is positioned in an interior of the liquid dispenser;

an air producer operable to direct an air flow into an air inlet of the air supply member;

an actuator that is configured to open and close the positive pressure valve assembly; and a controller that receives information from one or more sensors to operate the air cooler, the air producer, and the actuator.

22. The liquid dispenser of claim 21, wherein the one or more sensors include a load sensor, wherein the load sensor determines a volume of the liquid in the container.

23. The liquid dispenser of claim 21, wherein the one or more sensors include an air pressure sensor.

24. The liquid dispenser of claim 21, wherein the one or more sensors include a temperature sensor.

* * * * *